United States Patent [19]

Repella

[11] Patent Number: 4,497,496
[45] Date of Patent: Feb. 5, 1985

[54] HYDRODYNAMIC SLITTED SEAL AND METHOD OF MANUFACTURE THEREOF

[75] Inventor: James A. Repella, Berkley, Mich.

[73] Assignee: Microdot Inc., Darien, Conn.

[21] Appl. No.: 603,148

[22] Filed: Apr. 23, 1984

Related U.S. Application Data

[63] Continuation-in-part of Ser. No. 494,817, May 16, 1983, Pat. No. 4,451,050, which is a continuation-in-part of Ser. No. 322,640, Nov. 18, 1981, abandoned, and a continuation-in-part of Ser. No. 350,359, Feb. 19, 1982, Pat. No. 4,450,614.

[51] Int. Cl.³ .................. F16J 15/32; F16J 15/54; B23D 17/00; B21D 39/00
[52] U.S. Cl. .................. 277/134; 277/1; 277/152; 29/417; 29/148.4 S
[58] Field of Search ............ 277/1, 134, 152, 153, 277/154; 29/148.4 S, 417; 83/54, 861, 862, 879, 880

[56] References Cited

U.S. PATENT DOCUMENTS

| | | | |
|---|---|---|---|
| 3,640,542 | 2/1972 | Mowat et al. | 277/134 |
| 3,857,156 | 12/1974 | Clark | 29/148.4 S |
| 3,929,341 | 12/1975 | Clark | 29/148.4 S |
| 4,118,856 | 10/1978 | Bainard et al. | 29/511 |
| 4,450,614 | 5/1984 | Repella | 29/417 |
| 4,451,050 | 5/1984 | Repella | 277/134 |

FOREIGN PATENT DOCUMENTS

| | | | |
|---|---|---|---|
| 2843401 | 4/1980 | Fed. Rep. of Germany | 277/134 |
| 225796 | 3/1969 | Sweden | 277/134 |

Primary Examiner—Robert S. Ward
Attorney, Agent, or Firm—Lyman R. Lyon

[57] ABSTRACT

An oil seal element and method of manufacture thereof from polytetrafluoroethylene or the like. A tubular billet having concentric inner and outer cylindrical surfaces is provided with a frusto-conical end face. Arcuate slits of varying depth and angle are cut in the end face of the billet at each of a plurality of angularly spaced positions. Indexing of the billet is synchronized with rotation of the slitting tool. A disk of desired thickness having arcuate slits on one of its faces is then sliced from the billet, thereby also facing the billet for the next slitting sequence.

12 Claims, 5 Drawing Figures

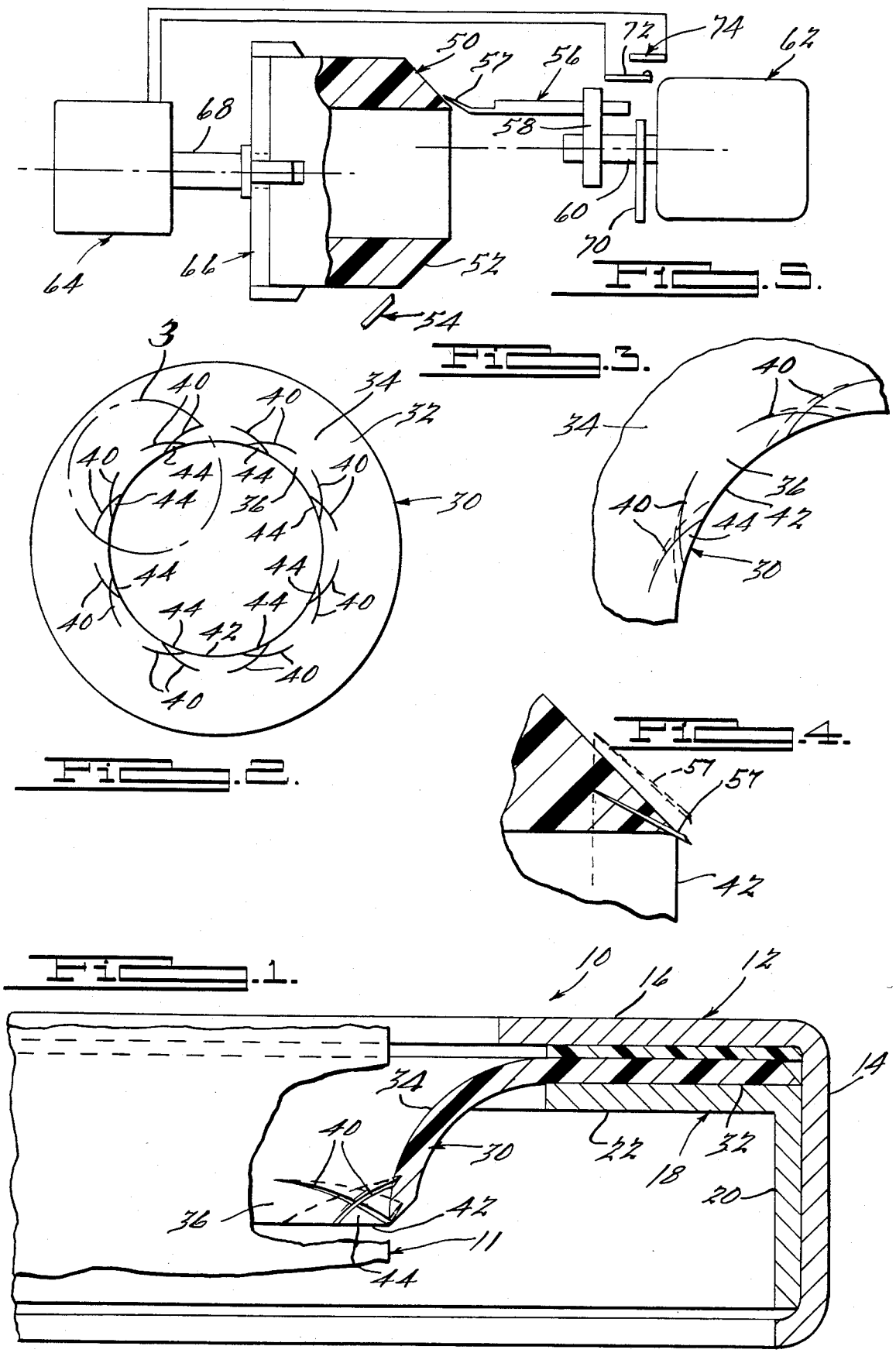

HYDRODYNAMIC SLITTED SEAL AND METHOD OF MANUFACTURE THEREOF

CROSS REFERENCE TO RELATED APPLICATION

This application is a continuation-in-part of application Ser. No. 494,817, filed May 16, 1983, and now U.S. Pat. No. 4,451,050, for Bi-Directional Hydrodynamic Seal, which is a continuation-in-part of application Ser. No. 322,640, filed Nov. 18, 1981, for Bi-Directional Hydrodynamic Seal (now abandoned); and is a continuation-in-part of applicant's copending application Ser. No. 350,359, filed Feb. 19, 1982, and now U.S. Pat. No. 4,450,614, for Method of Making a Polytetrafluoroethylene Hydrodynamic Seal.

BACKGROUND OF THE INVENTION

Polytetrafluoroethylene seals are well known for their ability to withstand the environmental conditions to which oil seals are exposed incident to sliding contact with a shaft. However, the inability to mold such seals in an efficient manner has forced the industry to turn to other manufacturing techniques. The most successful technique heretofore used comprised grooving the end of a billet of polytetrafluoroethylene and thereafter cutting the polytetrafluoroethylene seal element from the billet as taught in, for example, U.S. Pat. No. 3,857,156. Other teachings of grooving a seal are found in the patents to Jagger U.S. Pat. No. b 2,606,779 and Corsi U.S. Pat. No. 4,132,421. Slitting of the end face of a billet is taught in applicant's copending application Ser. Nos. 322,640 (supra) and 494,817 (supra). An improved slitting apparatus is taught in applicant's copending application Ser. No. 350,359 (supra).

Patents that teach the use of built-up ribs to effect hydrodynamic pumping of oil are Bainard U.S. Pat. No. 4,118,856 or Jagger U.S. Pat. No. 3,620,540. A teaching of both ribs and grooves is found in the "Journal of Teflon", pages 2–4, January 1970. However both open grooves, slits, and built-up ribs exhibit operational problems to which the present invention presents a solution.

SUMMARY OF THE INVENTION

The present invention relates to a bi-directional hydrodynamic seal having a polytetrafluoroethylene seal element, the shaft engaging face of which has an improved hydrodynamic configuration in the form of a variable depth slit that is relatively deep at the oil interface and gradually decreases in depth toward the dry side of the seal thereby maximizing both hydrodynamic pumping efficiency and flex integrity.

More specifically, a series of circumferentially spaced, overlapping, arcuate slits extend at varying depths and at varying angles relative to the central axis of a shaft about which the seal is disposed. The slits at the oil side of the seal are of maximum depth adjacent the oil side of the seal lip. The seal is manufactured by use of a novel truncated conical billet of polytetrafluoroethylene which, in conjunction with the slitting apparatus disclosed in applicant's copending application Ser. No. 350,359 (supra), results in uniform, variable depth slits. The seal element is supported in the conventional manner by a pair of metal stampings to facilitate mounting about a shaft.

BRIEF DESCRIPTION OF THE DRAWINGS

In the drawings:

FIG. 1 is a fragmentary view of the polytetrafluoroethylene seal element assembled in a supporting metal stamping and flexed to a cylindrical configuration at the oil side thereof due to assembly with a shaft;

FIG. 2 is a plan view of a polytetrafluoroethylene seal element in accordance with the present invention;

FIG. 3 is an enlarged view taken within the circle 3 of FIG. 2;

FIG. 4 is a sectional view of the slitting tool at the point of intersection with the radially inner diameter of the polytetrafluoroethylene billet; and FIG. 5 is an elevational view of the billet and apparatus for the slitting thereof.

DETAILED DESCRIPTION OF THE PREFERRED EMBODIMENT OF THE INVENTION

As best seen in FIG. 1, a shaft seal 10 is shown operatively disposed about a shaft 11. The seal 10 comprises an outer case 12 having a cylindrical portion 14 and a radial flange 16. An inner case 18 has a cylindrical portion 20 and a radial flange 22 and is nested in the outer case 12. A seal element 30, preferably made from polytetrafluoroethylene, has a flat radially outer portion 32, an intermediate flex portion 34, and a generally cylindrical shaft engaging radially inner portion 36.

In accordance with the present invention, the shaft engaging radially inner portion 36 of the polytetrafluoroethylene seal element 30 is provided with a plurality of arcuate slits 40 that intersect a radially inner edge 42 of the element 30. The slits 40 vary in depth from a minimum at the flex portion 34 of the seal element 30 to a maximum at the edge 42 thereof. At the point of maximum spacing from the edge 42, the slits 40 extend at an angle of approximately 45° to the central axis of the shaft 11. It is to be noted that as the angle of the slit 40 decreases relative to the central axis of the seal element 30, the depth thereof increases along the arc of the slit. Accordingly, a relatively efficient and high capacity pumping configuration is presented to the shaft 11 at the intersection of the slits 40 with the edge 42 of the element 30 while a desirable flex configuration is presented at the runout point of the slits 40 axially spaced from the edge 42. More specifically, while the depth of the slits 40 varies, the angle thereof is maintained at 45° relative to a tangent to the surface of the shaft 11 in a plane containing the axis of generation of the arc of the slits 40, as will be described in greater detail. The slits 40 deflect oil carried circumferentially upon rotation of the shaft 11 axially toward the oil side of the seal due to an oil collecting and pumping action generated by a pressure differential across the slits 40. Because oppositely directed arcs of the slits 40 intersect the oil side of the seal element 30, rotation of the shaft 11 in either direction relative to the seal 10 will effect hydrodynamic pumping of oil back to the oil side of the seal 10. In this regard, the end portions of the slits 40 intersect to define a plurality of circumferentially spaced triangular pads 44.

In a constructed embodiment of the instant invention, the radius of the slits 40 is less than the radius of the aperture in the seal element 30, and the radial height of the slits 40 from the inner edge of the element 30, as seen in FIG. 2 is approximately one-fourth to one-eighth the radius thereof.

As seen in FIG. 5, the present invention features a novel cylindrical polytetrafluoroethylene billet and method for making the seal element 30. Highly desirable variation in the depth of the slits 40 is accomplished through the use of a billet 50 of polytetrafluoroethylene having a frusto-conical end face 52. The end face 52 is initially machined by a blade 54 to insure that it is concentric with the central axis of the billet 50.

A slitting tool 56 having an angularly related cutting edge 57 is mounted in a holder 58 which in turn is mounted on a shaft 60 of a gearmotor 62. The axis of rotation of the shaft 60 is radially displaced from the central axis of the billet 50 and the diameter of the circle traced by the tip of the blade 57 of the tool 56 is less than the internal diameter of the billet 56.

Rotation of the blade 57 of the tool 56 results in the blade 57 cutting the arcuate slits 40 in the end face 52 of the billet 50.

After the first pair of slits 40 are cut in the end face 52 of the billet 50, the billet 50 is rotated about its central axis to a circumferentially spaced second position by an indexing motor 64. A suitable chuck 66 is mounted on an output shaft 68 of the gearmotor 64 for supporting the billet 50.

To make the seal element 30 of FIG. 2 of the drawings, the billet 50 is rotated or indexed in 45 degree increments about its central axis, the tool 56 cutting a pair of slits 40 in the conical end face 52 at each of the indexed stations. The gearmotor 64 and tool 56 are controlled by a conventional electronic counter, not shown, each revolution of the shaft 60 of the motor 62 bringing a cam 70 thereon into engagement with a movable contact 72 of a switch 74. Closure of the switch 74 completes an electrical circuit that energizes the indexing motor 64 for rotation through a 45° arc. Thus, rotation of the tool 56 and indexing of the billet 50 is fully synchronized. In this manner, the end face 52 of the billet 50 is provided with sixteen discrete slits 40 resulting in the configuration shown in FIG. 2 of the drawings. Because the end face 52 of the billet 50 is frusto-conical, the slits 40 vary in depth.

After the end face 52 is indexed through 360 degrees, the cutoff blade 54 is advanced to cut off a relatively thin slice or wafer of polytetrafluoroethylene thereby to complete the seal element 30. The aforesaid operation is repeated until the entire billet 50 is consumed.

While the preferred embodiment of the invention has been disclosed, it should be appreciated that the invention is susceptible of modification within the scope of the following claims.

I claim:

1. A bi-directional hydrodynamic oil seal comprising an annular case, and a thin washer-like seal element having a radially outer portion supported by said case and a generally cylindrical radially inner portion adapted to engage a shaft, the radially inner portion of said seal element having a plurality of generally arcuate slits in the surface thereof that extend at an acute angle relative to the central axis of the shaft and divergent from the oil side of said seal and intersect the radially inner edge of said seal element to effect hydrodynamic pumping in conjunction with a rotating shaft, said slits varying in depth from a maximum at the oil side of the radially inner portion thereof to a minimum at the dry side thereof.

2. A seal in accordance with claim 1, wherein the radius of said slits is less than the diameter of the shaft engaging portion of said seal element.

3. A seal in accordance with claim 2 wherein said slits farthest from the oil side of said seal extend at an angle larger relative to the central axis of said shaft than the angle of the slits closest to the oil side of said seal.

4. A seal in accordance with claim 1 wherein said arcuate slits intersect one another intermediate their length to define generally triangular pads engageable with the surface of the shaft.

5. A seal in accordance with claim 1 wherein said arcuate slits run out so as to eliminate flex lines in a portion of said element between said radially inner portion and outer portions of said seal element thereby to facilitate uniform deflection of said radially inner portion into full contact with said shaft.

6. A method of making a hydrodynamic seal element from a billet of material having coaxial radially inner and outer cylindrical surfaces comprising the steps of facing off one end of said cylindrical billet to define a right frusto-conical end face relative to the central axis of the billet, indexing said billet about the central axis thereof to a first position, advancing a slitting tool axially relative to said billet into spaced relation to the frusto-conical end face thereof, rotating said slitting tool about an axis spaced from the central axis of said billet to cut an arcuate slit of varying depth in the frusto-conical end face thereof, indexing said billet about the central axis thereof to a second position, rotating said cutting tool about the axis of rotation thereof to cut a second arcuate slit in said end face, and advancing a slicing tool at an angle parallel to the angle of said frusto-conical end face against said billet to slice off a relatively thin layer thereof.

7. A method in accordance with claim 6 wherein the radius of said arcuate slits is less than the radius of the radially inner surface of said billet.

8. A method in accordance with claim 6 wherein said arcuate slits overlap to define a triangle on the frusto-conical end face of said billet.

9. A method in accordance with claim 6 wherein a cutting edge of said slitting tool extends at an angle relative to the axis of rotation thereof.

10. A method in accordance with claim 6 wherein said slitting tool is advanced axially of said billet when said tool is exteriorly thereof.

11. A method in accordance with claim 6 wherein said billet is indexed when said cutting tool is disposed exteriorly thereof.

12. A method in accordance with claim 6 wherein the axis of rotation of said tool is parallel to the central axis of said billet.

* * * * *